US006926950B2

(12) United States Patent
Fernfors et al.

(10) Patent No.: US 6,926,950 B2
(45) Date of Patent: Aug. 9, 2005

(54) PRODUCTION OF A DYED PATTERNED WEB

(75) Inventors: Ingemar Fernfors, Mölndal (SE); Michael Linder, Göteborg (SE); Urban Nilsson, Hålta (SE)

(73) Assignee: SCA Hygiene Products AB, Gothenburg (SE)

( * ) Notice: Subject to any disclaimer, the term of this patent is extended or adjusted under 35 U.S.C. 154(b) by 0 days.

(21) Appl. No.: 10/739,032

(22) Filed: Dec. 19, 2003

(65) Prior Publication Data

US 2004/0182261 A1 Sep. 23, 2004

Related U.S. Application Data

(60) Provisional application No. 60/434,652, filed on Dec. 20, 2002.

(51) Int. Cl.[7] .................................................. B32B 27/14

(52) U.S. Cl. ................. 428/198; 428/315.5; 428/315.9; 428/316.6; 428/339

(58) Field of Search ............................ 428/198, 315.5, 428/315.9, 316.6, 339

(56) References Cited

U.S. PATENT DOCUMENTS

| | | | |
|---|---|---|---|
| 3,867,225 A | 2/1975 | Nystrand | |
| 5,204,165 A | 4/1993 | Schortmann | |
| 5,223,329 A | 6/1993 | Amann | |
| 5,339,730 A | 8/1994 | Ruppel et al. | |
| 5,503,076 A | 4/1996 | Yeo | |
| 2004/0182261 A1 * | 9/2004 | Fernfors et al. | 101/125 |

FOREIGN PATENT DOCUMENTS

| | | | |
|---|---|---|---|
| EP | 0 569 860 | 11/1993 | |
| EP | 07 738 588 | 10/1996 | |
| EP | 1 304 215 | 4/2003 | |
| EP | WO 2004/057110 A1 * | 7/2004 | D21H/27/02 |
| JP | 07-266526 | 10/1995 | |
| WO | 01/47700 | 7/2001 | |
| WO | 02/27098 | 4/2002 | |

* cited by examiner

*Primary Examiner*—B. Shewareged
(74) *Attorney, Agent, or Firm*—Burns, Doane, Swecker & Mathis, L.L.P.

(57) ABSTRACT

The present invention relates to a method for production of a three-dimensional dyed macropattern in a web of web-shaped flexible material. The method comprises a bonding device being made, in interaction with the dye-coated tops of the raised macroportions, to form bonding points and three-dimensional bonding areas at the same time as the bonding areas and/or the bonding points are dyed, thereby forming a three-dimensional dyed macropattern.

7 Claims, 5 Drawing Sheets

PRODUCTION OF A DYED PATTERNED WEB

CROSS-REFERENCE TO RELATED APPLICATIONS

This application claims the benefit under 35 U.S.C. § 119(e) of U.S. provisional application 60/434,652 filed on Dec. 20, 2002, the entire content of which is incorporated by reference.

BACKGROUND

1. Technical Field

The present invention relates to a method for production of a three-dimensional dyed macropattern in a web of web-shaped flexible material. The method comprises bringing at least parts of a pattern device, which has a three-dimensional macropattern of alternate raised macroportions and lowered macroportions, into contact with a dye-application device in such a way that a dye is applied to the pattern device only on the tops of the raised macroportions. The method also comprises bringing the web into contact with the tops of the dye-coated raised macroportions in such a way that dyeing of the web takes place in a dyed macropattern corresponding to the design of the tops of the raised macroportions. The web is moreover brought into contact with a bonding device which forms bonding points in the web and also three-dimensional bonding areas coinciding with the bonding points. The invention also relates to a device for manufacturing the web and also the web manufactured by means of the method.

2. Related Art

In the manufacture of, e.g., absorbent articles, it is known to mechanically emboss a three-dimensional pattern in one or more layer(s). It is also known to dye the embossed pattern so as to obtain a visually improved pattern.

It is also known to laminate two or more layers together in a multilayer web in order to manufacture the end product. In this way, a softer and more flexible end product is obtained than if a single layer with thickness and weight per unit area corresponding to those of the laminated product had been manufactured. It is known that the lamination of two or more tissue layers is effected by means of gluing. The glue can then be colored so as to dye those parts of the laminate which have been glued together. One problem with this technique is glue bleed-through, i.e., as the adhesive is pressed through the layer, the adhesive soils the counter-roller. Soiling of other machinery and parts in the process by adhesive is moreover a widely known problem.

A further problem with using adhesive is that hard crust-like surfaces appear on one or both side(s) of the layer, which can feel unpleasant for a user. The solidified adhesive may moreover be liquid-impermeable and can therefore give rise to liquid-permeability problems in the material. Other disadvantages of adhesive are that it is consumed in great quantities and therefore generates undesirable cost.

A further problem associated with the use of colored adhesive is that it can be difficult to combine with other joining methods, such as welding, as the risk of glue bleed-through increases and there is also a risk of the adhesive burning and soiling the machinery further.

All the previously known methods of dyeing and connecting a multilayer web comprise the step of dyeing the bonding points before or after the layers are connected. In the case of the bonding points being dyed before bonding takes place, the dye can flow out and cause a problem with an unclear pattern. When the bonding points are dyed after bonding has taken place, problems arise with the precision of the dyeing.

It is therefore desirable to find an improved method of dyeing and embossing a web. It is especially desirable to dye and join together a multi-layer web. The method should give an improved visual pattern irrespective of the thickness of the layers, but preferably for thin material. The desired product is to feel soft and comfortable to the user and to be aesthetically attractive by virtue of a three-dimensional dyed pattern. The pattern is to consist of the three-dimensional bonding areas which originate in the bonding points and also dyeing of the bonding areas and/or the bonding points.

SUMMARY

The object of the present invention is to solve the above-mentioned problems by providing an improved method of creating a three-dimensional dyed macropattern in a web, preferably a multi-layer web, of web-shaped flexible material. The material in the web be thermally bondable. Examples of such materials are non-woven material comprising thermally bondable material, wadding, foam and plastic film made of, e.g., polyethylene and polypropylene. The web is intended mainly to be used, after processing such as cutting, as a layer in an absorbent article, where the dyed three-dimensional pattern is intended to face away from a user but can also be applied so as to face towards a user.

The improved method is brought about by virtue of at least parts of a pattern device, which has a three-dimensional macropattern of alternate raised macroportions and lowered macroportions, being brought into contact with a dye-application device in such a way that a dye is applied to the pattern device only on the tops of the raised macroportions. The web is brought into contact with the tops of the dye-coated raised macroportions in such a way that dyeing of the web takes place in a dyed macropattern corresponding to the design of the tops of the raised macroportions. The web is moreover brought into contact with a bonding device which forms bonding points in the web and also three-dimensional bonding areas coinciding with the bonding points.

Bonding points mean those parts of the material in the web which, on account of the bonding device, have been connected thermally.

Bonding areas mean those three-dimensional areas in the web which are formed coinciding with the bonding points on account of the tops of the raised macroportions and the bonding points. The three-dimensional raised macroportions press the material in the web together in such a way that an indentation of the web material takes place in the form of the bonding areas coinciding with the bonding points. The bonding points moreover draw the material coinciding with the bonding areas together in such a way that the bonding areas do not return elastically to their original shape when the raised macroportions cease bearing against the web.

In one embodiment, the invention is characterized in that the bonding device is made, in interaction with the dye-coated tops of the raised macroportions, to form the bonding points and the three-dimensional bonding areas at the same time as the bonding areas and/or the bonding points are dyed.

The bonding points are dyed in those cases where the bonding points have an extent which means that the bonding points coincide with the three-dimensional bonding areas. The bonding points are dyed in cases where the dye spreads into the material to the bonding points. A bonding point may therefore be dyed completely or partly. Because the bonding point consists of a solidified melt, the dye is preferably mixed at least partly with the melt when the bonding point is formed. The above dyeing depends on the properties of the dye together with the material properties of the web.

As mentioned above, the bonding device forms a three-dimensional macropattern in the web in the same step as the pattern device forms the dyed macropattern. Owing to the fact that the three-dimensional macropattern is formed in the same points as the dyed macropattern, the three-dimensional dyed macropattern is formed.

The dye-coated tops of the raised macroportions therefore bring about simultaneous formation of both the three-dimensional macropattern (in the form of the bonding points and the three-dimensional bonding areas) and the dyed macropattern. Owing to the fact that the three-dimensional macropattern is created in the same step and in the same place as the dyed macropattern, the dyeing of the three-dimensional bonding areas and/or the bonding points is very exact, and the three-dimensional dyed pattern is clear and has a good visual effect.

A number of advantages are achieved by carrying out the formation of the three-dimensional macropattern and the dyeing of the three-dimensional pattern at the same time and in the same points. For example, use of the method according to the invention results in the dyeing of an embossed pattern in the web and the embossed pattern coinciding in the same points irrespective of the production line speed. The present invention therefore allows a high production speed with good quality of the three-dimensional pattern being retained. In the case of the previously known art, the web is embossed on one occasion and dyed on another, which gives rise to difficulties in fitting the dyed pattern to the three-dimensional embossed macropattern with precision. In such cases, smeary and imprecisely dyed three-dimensional macropatterns are common, which gives rise to a poor visual effect with a blurred and unclear impression.

Another advantage of the invention is that not all the tops have to be dye-coated, but those tops which are not dye-coated may form bonding points and a three-dimensional macropattern which is not dyed. The freedom of choice to form a product pattern consisting of both dyed and undyed three-dimensional macropatterns is of course an advantage for the manufacturer.

When the web consists of one layer, the bonding points are formed inside the layer at the same time as the raised macroportions press the layer together at the bonding points, the three-dimensional bonding areas appearing in the form of indentations in the material coinciding with the bonding points. The bonding points ensure that the three-dimensional bonding area retains its shape because the layer cannot return to its original shape on account of the bonding points. A great advantage of the bonding points being located inside the layer is that the bonding points, which are often hard, are not located in the surface layer of the web and therefore cannot irritate a user.

According to one embodiment of the invention, the web consists of a multilayer web comprising a first layer and a second layer of web-shaped flexible material. The first layer is brought into contact with the tops of the dye-coated raised macroportions. The first layer is moreover connected to the second layer in such a way that bonding points are formed between them.

In the embodiment concerned, the bonding device forms the bonding points by joining the first layer to the second layer in interaction with the dye-coated tops, in which way the multilayer web is provided with the three-dimensional dyed macropattern where the bonding areas and/or the bonding points are dyed.

In one embodiment, the bonding points are advantageously formed between the layers with a certain spreading between the layers. Just as in the case of the web in the form of one layer, the bonding points are formed at the same time as the raised macroportions press the layers together at the bonding points, the three-dimensional bonding areas appearing in the form of indentations in the material in the web coinciding with the bonding points. The bonding points ensure that the three-dimensional bonding area retains its shape because the two layers cannot return to their original shape on account of the bonding points.

In an embodiment with two layers, the advantages of the invention are especially marked. As mentioned previously, it is known to join a layer made with a dyed pattern consisting of a colored adhesive to another layer made with an embossed pattern, which gives rise to problems with the precision of the synchronization of the joining of the two patterns. Moreover, the dyed layer may be smeared around the embossed portions and give rise to a blurred macropattern. In cases where the dyeing takes place after bonding, problems also arise with the precision of the dyeing. Such problems are eliminated by the invention according to one embodiment because the embossing, the joining of the layers via the bonding points, and the dyeing of the pattern may take place at the same time, i.e., in one step.

According to another embodiment of the invention, the tops of the raised macroportions comprise a topographical surface comprising raised microportions. In accordance with the inventive idea, the tops of the raised macroportions, which in one embodiment consist of the raised microportions, are dye-coated. The raised microportions are therefore dye-coated and give rise to micropatterns in the macropattern in such a way that the three-dimensional dyed macropattern becomes visible. The raised microportions can be designed in any known manner, e.g., in the form of cylindrical elements, rhombic elements, wave-shaped elements, etc. When the macropattern is formed, it is normally the case that the dye spreads between the raised microportions and brings about a relatively uniform distribution of dye over the entire macropattern. It may also be the case that the macropattern consists of a number of micropatterns which create a visual impression of uniform dyeing of the macropattern for an observer when the observer is located at a certain distance from the pattern.

The raised microportions may give rise to bonding micropoints and three-dimensional bonding microareas coinciding with the raised microportions in the same way as the raised macroportions give rise to bonding points and three-dimensional bonding areas. In such cases, the bonding points consist of a number of bonding micropoints and the three-dimensional bonding areas of the same number of three dimensional bonding microareas.

In cases where there are no raised microportions, the macropattern consists of course of the three-dimensional bonding area, with a size which corresponds to the size of the top of the raised macroportion. In this case, the dyeing of the bonding points and the three-dimensional bonding areas will be uniformly distributed over the entire macropattern.

According to another embodiment of the invention, the pattern device comprises an embossing roller or a pattern roller which forms the three-dimensional macropattern. The pattern device can also consist of a die with raised macroportions and lowered macroportions or a conveyor belt with raised macroportions and lowered macroportions.

As mentioned above, the web may be treated in such a way that bonding points arise. This is brought about by thermal joining of material. Because the bonding points are to be formed by thermal joining, at least parts of the web are to comprise thermally bondable material. Such materials are well known and can consist of individual fibers which bond other thermally bondable fibers or which bond fibers which are not thermally bondable.

According to one embodiment of the invention, the bonding device consists of an ultrasonic device which forms the bonding points via a melt in the web. In one embodiment, the ultrasonic device operates with a frequency above 18 kHz, preferably in the range 20–60 kHz, and most advantageously in the range 20–40 kHz.

One advantage of the ultrasonic device is that the melt arises inside a material in the case of a web consisting of one layer or between the layers in the case of a multilayer web in such a way that the solidified melt which forms the bonding points does not appear on the outside of the web. As mentioned previously, this is an advantage as a user does not experience discomfort from the rigid bonding points.

In another embodiment, the bonding device forms the bonding points in the web via a melt by use of a support roller against the pattern device. In such a device, use is made of the frictional heat in the material in order to obtain a melt in the web at the points marked by the raised macroportions and any raised microportions. The frictional heat depends on the pressure which arises in the material between the support roller and the pattern device and also the speed of the various parts.

When use is made of a support roller, the support roller and/or the pattern device may be hot, or both may be cold. A hot device supplies heat to the web because some materials can require a greater amount of heat in order for the bonding points to be formed, or in order to speed up the melting process at the bonding points.

In one embodiment, the invention advantageously uses a non-adhesive dye for dyeing the web. In this way, production is less expensive, and the risk of production-hampering soiling of machinery included in the production is reduced.

Non-adhesive dye means a dye which is not intended to bond fibers or several plies of film together. The dye does not on this account have to be repellent to all materials, but the dye bonds to various materials in a way which is normal for dye pigment or dye pigment in a liquid solution. Should the dye have a slightly adhesive effect, i.e., should the dye, as a secondary effect or in a more random manner, be capable of bonding fibers or films together, such a dye does not have to be excluded from the inventive idea. The primary criterion is that the dye does not have such an adhesive effect as is intended to form bonding points in a material or between different layers. An example of such an adhesive dye is colored glue.

One advantage of using a non-adhesive dye is that the disadvantages indicated in the description of previously known art can be avoided. An example of such an advantage is that glue bleed-through is avoided and a soft user-friendly product is obtained. Problems of soiling of the parts involved in the process are also avoided.

Another embodiment of the invention relates to a product manufactured by means of the method according to the invention described above. Such a product consists of a web or part of a web comprising a product pattern consisting of one or more macropattern(s), some or all of which can be dyed according to the invention.

Such a web therefore consists of a web-shaped flexible material with a three-dimensional dyed macropattern. The web comprises bonding points and three-dimensional bonding areas coinciding with the bonding points. The product is characterized in that the bonding points consist of a solidified melt from joined material produced by a bonding device in interaction with the tops of the raised macroportions of a pattern device. The bonding points and the three-dimensional bonding areas bring about the formation of a three-dimensional macropattern in the web. The bonding areas and/or bonding points have been dyed with a dye via the tops of the raised macroportions at the same time as the bonding points were formed, the three-dimensional dyed macropattern having been formed in this operation.

An advantageous embodiment of the product is obtained when the web consists of two layers which have been treated according to a method according to the embodiments above.

An embodiment of the invention also relates to a device for implementing the method of producing the product as above. The device comprises a pattern device having a three-dimensional macropattern of alternate raised macroportions and lowered macroportions. The device also comprises a dye-application device arranged so as to apply a dye only to the tops of the raised macroportions. The pattern device is arranged so as to dye the web with the dyed macropattern. The device also comprises a bonding device which is arranged so as to form bonding points in the web and also three-dimensional bonding areas coinciding with the bonding points.

In one embodiment, the device is characterized in that the bonding device is arranged so as, in interaction with the dye-coated tops of the raised macroportions, to form the bonding points and the three-dimensional bonding areas at the same time as the bonding areas and/or the bonding points are dyed, the three-dimensional dyed macropattern being formed in this operation.

Advantages of using certain special devices, e.g., an ultrasonic device and embossing roller, have been mentioned previously.

In a case with two layers, the device is arranged so as to advantageously cause the bonding device to act simultaneously on the first layer, the second layer and the dye-coated raised macroportions of the embossing roller, exact dyeing of the desired three-dimensional pattern being achieved.

In the present invention, the terms bonding points and bonding areas mean any shape of bonding points and thus bonding areas. Examples of such shapes are dots, lines or any other geometrical shape. The raised macroportions of the pattern device give rise to the shape of the bonding points, for which reason the raised macroportions of the embossing roller can therefore be arranged in any geometrical shape.

According to embodiments of the invention for a multilayer web, the first layer and/or the second layer is/are thermally bondable. Examples of such materials are fibrous materials comprising at least partly thermally bondable materials. The quantity of thermally bondable materials is to be so great that a melt is produced, which can connect the two layers. Such materials may consist of thermally bondable polymers, e.g., polyester, polypropylene, polyethylene or the like. The materials may also consist of mixtures of thermally bondable polymers and/or other fibrous materials.

As mentioned above, embodiments of the present invention can advantageously be used for manufacturing a dyed three-dimensional web which, after processing, can be used in an absorbent article such as a diaper, incontinence pad, panty liner, sanitary towel or the like. A sanitary article usually consists of a number of layers arranged in a layered structure, one layer of which constitutes a backing, another layer of which constitutes a surface layer, and a further layer of which constitutes an absorbent body positioned therebetween. Use can moreover be made of a spreading layer. The various layers can advantageously consist of a part of a dyed three-dimensionally patterned web of the type to which the present invention relates.

The various layers can consist of a large number of materials to which the present invention can be applied. Examples of such materials are given below in a description of an absorbent article.

Backing

The liquid-blocking backing layer consists of a liquid-impermeable material. Thin, liquidtight plastic films are suitable for the purpose, but it is also possible to use materials which are initially liquid-permeable but have been provided with a coating of plastic, resin or another liquidtight material. In this way, leakage of liquid from the underside of the absorbent article is prevented. The barrier layer can therefore consist of any material which satisfies the criterion of liquid-impermeability and is sufficiently flexible and skin-friendly for the purpose.

Examples of materials which are suitable as barrier layers are plastic films, non-wovens and laminates of these. The plastic film may be made of, e.g., polyethylene, polypropylene or polyester. Alternatively, the barrier layer may consist of a laminate of a liquid-impermeable plastic layer, facing the absorbent body, and a non-woven, facing the undergarments of the user. Such a construction provides a leakproof barrier layer with a textile feel. The liquid-blocking backing layer may also consist of a vapor-permeable material. Such a breathable backing layer can be made of, e.g., what is known as an SMS (spunbond-meltblown-spunbond) material or a breathable plastic film consisting of polyethylene. Such a plastic film is described in EP 283 200. In order to retain the breathability even when the material has been applied to a product, the underside of the product is preferably not completely covered by attachment means.

Surface Layer

The surface layer can be made of any conventional material, for example non-woven, perforated plastic film or a laminate of a perforated plastic film and a non-woven. It is also possible to use tow, which is a fibrous web with continuous fibers, or material made from foam.

Absorbent Body

The absorbent body is suitably made from one or more plies of cellulose pulp. The pulp can initially be in the form of rolls, bales or webs which, during manufacture of the sanitary towel, are dry-defibered and converted into fluffed form to form a pulp mat, sometimes with the addition of what are known as superabsorbents, which are polymers with the capacity to absorb several times their own weight of water or bodily fluid. An alternative to this is to dry-form a pulp mat as described in WO 94/10956. Examples of other absorbent materials which can be used are various types of natural fiber such as cotton fibers, peat or the like. It is of course also possible to use absorbent synthetic fibers, or particles of a highly absorbent polymer material of the kind which, during absorption, chemically binds great quantities of liquid while forming a liquid-containing gel, or mixtures of natural fibers and synthetic fibers. The absorbent body can also include other components, such as shape-stabilizing means, liquid-spreading means, or bonding means such as, e.g., thermoplastic fibers which have been heat-treated in order to hold short fibers and particles together in a coherent unit. It is also possible to use various types of absorbent foam material in the absorbent body.

In another embodiment, it is also possible for the method of the invention to be applied to transparent materials.

According to one embodiment of the invention, the web comprising one layer has a weight per unit area of 5–100 $g/m^2$, preferably 8–40 $g/m^2$ and most advantageously 8–30 $g/m^2$. In the case of a web comprising two layers, each layer can have a weight per unit area as above.

Further features of the invention emerge from the following description and the claims.

BRIEF DESCRIPTION OF FIGURES

The invention will be described in greater detail below with reference to illustrative embodiments shown in the accompanying drawings.

DETAILED DESCRIPTION OF THE PREFERRED EMBODIMENTS

Figure 1:
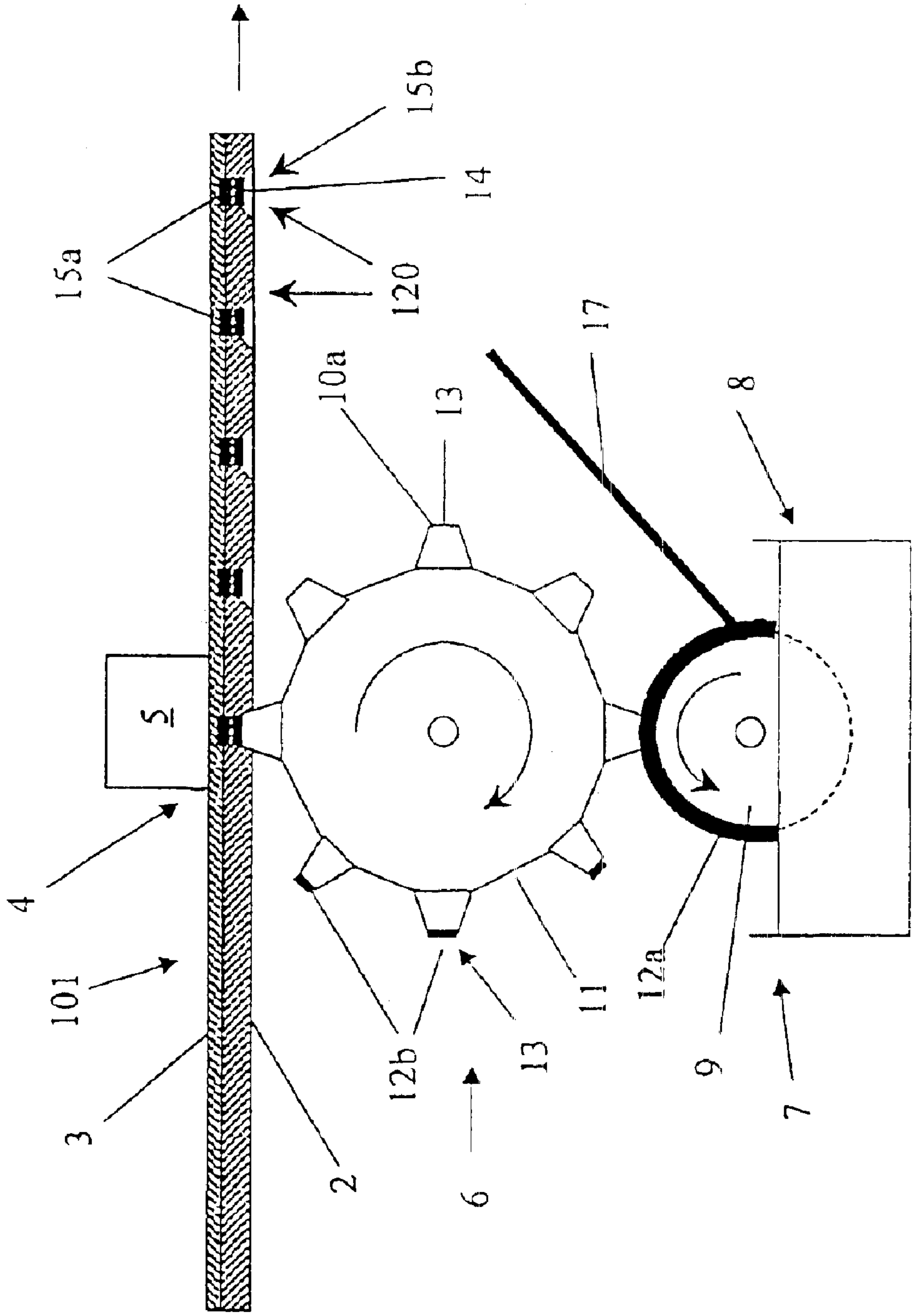
FIG. 1 shows diagrammatically a device for carrying out the method according to an embodiment of the invention, comprising an ultrasonic device and a web consisting of two layers.

FIG. 1 shows diagrammatically a device for carrying out the method according to an embodiment of the invention. FIG. 1 shows a multilayer web 101 consisting of a first layer 2 and a second layer 3 of web-shaped flexible material. The multilayer web 101 runs between a bonding device 4 in the form of an ultrasonic device 5 and a pattern device in the form of an embossing roller 6. FIG. 1 also shows a dye-application device 7 consisting of a dye bath 8, in the form of a vessel filled with dye, and a dye-application roller 9. The dye-application roller 9 is partly submerged in the vessel and is in this way dye-coated on that part of the dye-application roller 9 which is submerged. There are a number of possible application techniques for dye-coating the tops, for example by means of a series of several rollers and doctor blade chamber systems. In order to facilitate understanding of the invention, however, only one dye-application roller 9 and one doctor blade 17 are shown in FIG. 1.

In FIG. 1, the multilayer web 101 runs in the direction of the arrow, that is to say from left to right in the figure. The embossing roller 6 rotates clockwise so as to be capable of rotating with the multilayer web 101. The dye-application roller 9 rotates anticlockwise so as to be capable of rotating with the embossing roller 6.

The embossing roller 6 has a three-dimensional pattern of alternate raised portions, in the form of macroportions 10*a*, and lowered macroportions 11. The raised macroportions 10*a* are brought into contact with the dye-application roller 9 in such a way that a dye is applied to the embossing roller 6 only on the tops 13 of the raised macroportions 10*a*. The dye-application device 7 comprises a doctor blade 17 which acts on the dye-application roller 9. When the dye-application roller 9 rotates in the dye bath 8, the dye is applied to the surface of the rotating dye-application roller 9 in the form of a dye layer 12*a*. The doctor blade 17 ensures that the dye layer 12*a* remains at the desired thickness by virtue of the doctor blade 17 being arranged at a distance from the surface of the dye-application roller 9 which corresponds to the desired thickness of the dye layer 12*a*. The thickness of the dye layer 12*a* determines how thick the dye layer 12*b* applied to the tops 13 of the raised macroportions 10*a* is. The pattern device can also consist of another device suitable for the purpose, for example engraved rollers.

FIG. 1 shows that the first layer 2 is brought into contact with a dye-coated top 13 of a raised macroportion 10*a*. In conjunction with the first layer 2 coming into contact with the raised dye-coated top 13, the multilayer web 101 passes through the ultrasonic device 5. The ultrasonic device 5 acts with ultra sonic waves in the direction of the raised macroportions 10*a* in a known manner. The ultra sonic waves acts on the material in the multilayer web 101 in such a way that the temperature is increased and thermally influencable material melts, a melt arising between the layers 2, 3. According to an embodiment of the invention, the first layer 2 and/or the second layer 3 contain(s) sufficient thermally bondable material for a melt to arise.

The melt gives rise to bonding points 15*a* between the layers 2, 3 which connect the two layers. The bonding points 15*a*, together with the raised macroportions 10*a*, in turn give rise to bonding areas 15*b* being formed in such a way that they coincide with the bonding points 15*a*.

The ultrasonic device 4 is positioned in such a way that its active horn acts with a contact pressure against the web but at a distance from the tops 13 of the raised macroportions 10*a*. The distance between the horn and the tops 13, together with the frequency at which the ultrasonic device 5 operates, influences the material in a known manner so that the bonding points 15*a* and bonding areas 15*b* arise.

The bonding points 15*a* and bonding areas 15*b* form a three-dimensional macropattern (see FIG. 5) in the multilayer web 101. The bonding area 15*b* preferably has a design which corresponds to the design of the top 13 of the raised macroportion 10*a*. The bonding points 15*a* also have an appearance which, in the direction of travel of the web, corresponds to the top 13 of the raised macroportion 10*a*. The thickness of the bonding point can vary depending on the characteristics of the ultrasonic device 5 and also the material in the various layers. Thickness means an extent fundamentally at right angles to the direction of travel of the web 101.

FIG. 1 shows that the three-dimensional macropattern 15*b* is formed only in the first layer 2, but in an actual case the second layer 3 would also be provided with a certain three-dimensional character because the bonding points 15*a* draw the material in the two layers 2, 3 together at the bonding points. The reason for the three-dimensional macropattern 20, 21 being shown in the form of the bonding areas 15*b* only in the first layer 2 is that the raised macroportions 10*a* of the embossing roller 6, together with the bonding points 15*a* between the layers 2, 3, give rise to a clear three-dimensional pattern in the first layer 2.

FIG. 1 shows that the dye-coated tops 13 bear against the first layer 2 at the same time as the ultrasonic device 5 acts on the multilayer web 101. At the same time as the bonding points 15*a* and the bonding areas 15*b* are formed, the dye-coated tops 13 bear against the bonding areas 15*b*. The bonding areas 15*b* are therefore dyed at the same time as they are formed, a dyed three-dimensional macropattern 120 being formed.

The method shown in FIG. 1 gives rise to a bonding point 15*a* between the first layer 2 and a bonding area 15*b* in the second layer 3 having an appearance which corresponds to the shape of the top 13 of the raised macroportion 10*a*. The method according to the invention moreover provides a dyeing 14 of the bonding area 15*b* which also corresponds to the shape of the top 13 of the raised macroportion 10*a*. The method therefore brings about distinct and clear dyeing and embossing of a multilayer web 101 in the form of a dyed three-dimensional macropattern 120.

FIG. 1 shows that the dyed part 14 of the first layer 2 has dyed the bonding point 15*a* and the bonding area 15*b*. Depending on the material properties of the web, the properties of the dye and the properties of the melt, parts of or the entire melt may be dyed.

One advantage of using ultra sonic waves is that the melt arises in the boundary layer between the materials and spreads from there. Depending on the properties of the material, the pressure between the ultrasonic device and the raised macroportions, and the frequency of the ultra sonic waves, a melt can therefore arise in the joined web, where the melt passes through to neither, or only one, of the surfaces of the web. This yields a softer and better product as the solidified melt is not present in the surface and cannot irritate a user.

Figure 2:
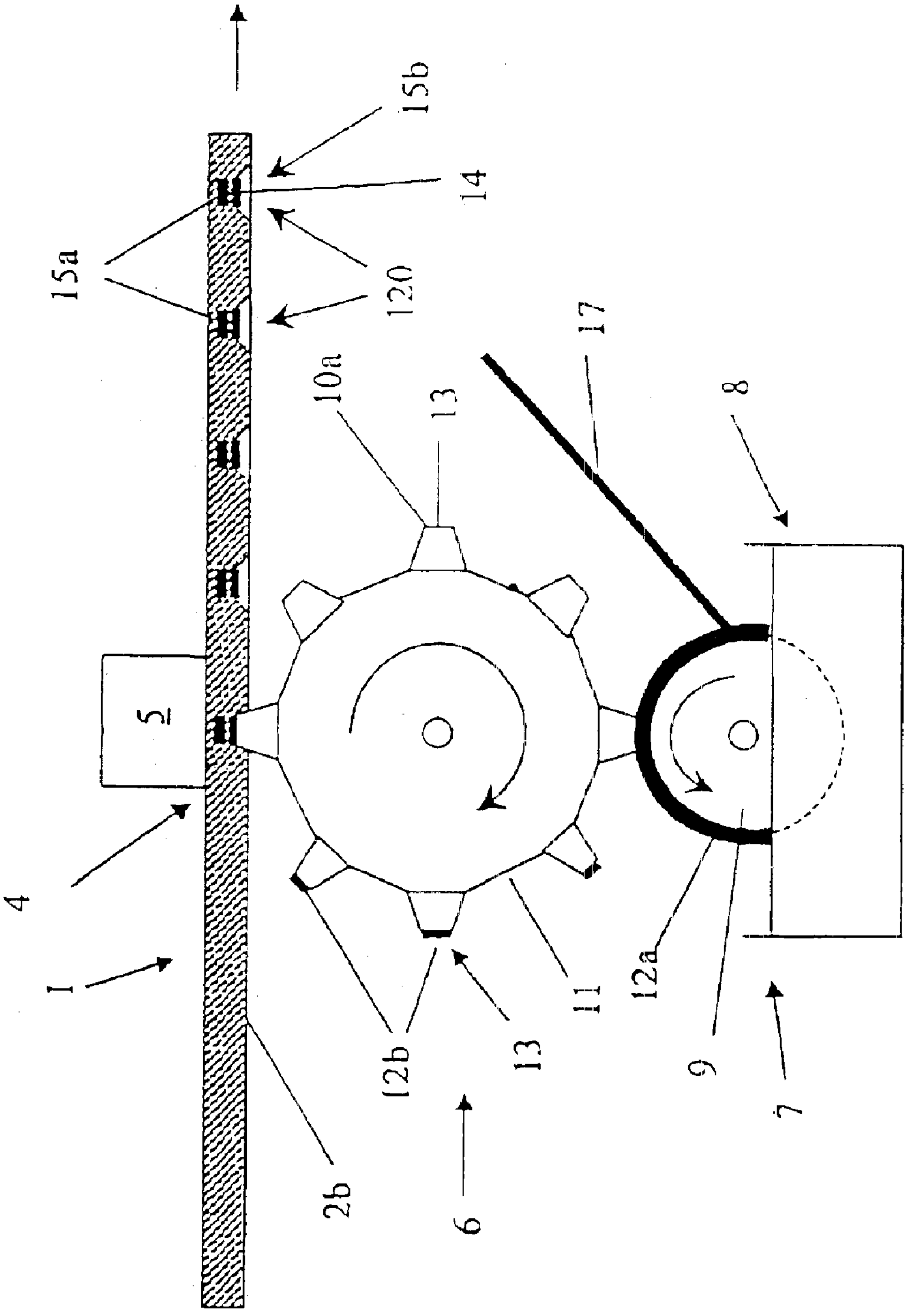
FIG. 2 shows diagrammatically a device for carrying out the method according to an embodiment of the invention, comprising an ultrasonic device and a web consisting of one layer.

FIG. 2 shows another embodiment of the invention, where the bonding device 4 consists of an ultrasonic device 5 and the web 1 consists of only one layer 2*b*.

The method according to embodiment of the invention described in FIG. 1 with simultaneous dyeing and embossing also functions on a web 1 consisting of one layer 2*b*. In the embodiment according to FIG. 2, the ultrasonic device acts on the dye-coated tops 13 of the raised macroportions 10*a*, a melt arising inside the layer at the same time as dyeing takes place. The melt also gives rise to bonding points 15*a* and bonding areas 15*b*, exactly as in the case of a multilayer web according to FIG. 1.

The difference between a multilayer web and a web comprising one layer 2*b* is that the bonding points 15*a* in the multilayer web arise between the layers, whereas the bonding points in the web 1 comprising one layer 2*b* arise inside the layer 2*b*. The bonding points 15*a* in FIG. 2 nevertheless give rise to the same type of bonding area 15*b* as in FIG. 1, which bonding areas 15*b* in turn give rise to a three-dimensional macropattern.

FIG. 2 shows that the dyeing of the bonding areas 15*b* takes place at the same time as the formation of the bonding points 15*a* and the bonding areas 15*b*. FIG. 2 shows that the dyed parts 14 coincide with the bonding areas 15*b* in such a way that a dyed three-dimensional pattern 120 is formed. The dyeing of the web has been discussed in detail in connection with the description of the embodiment of FIG. 1 and also applies in the case of an embodiment according to FIG. 2.

Figure 3:
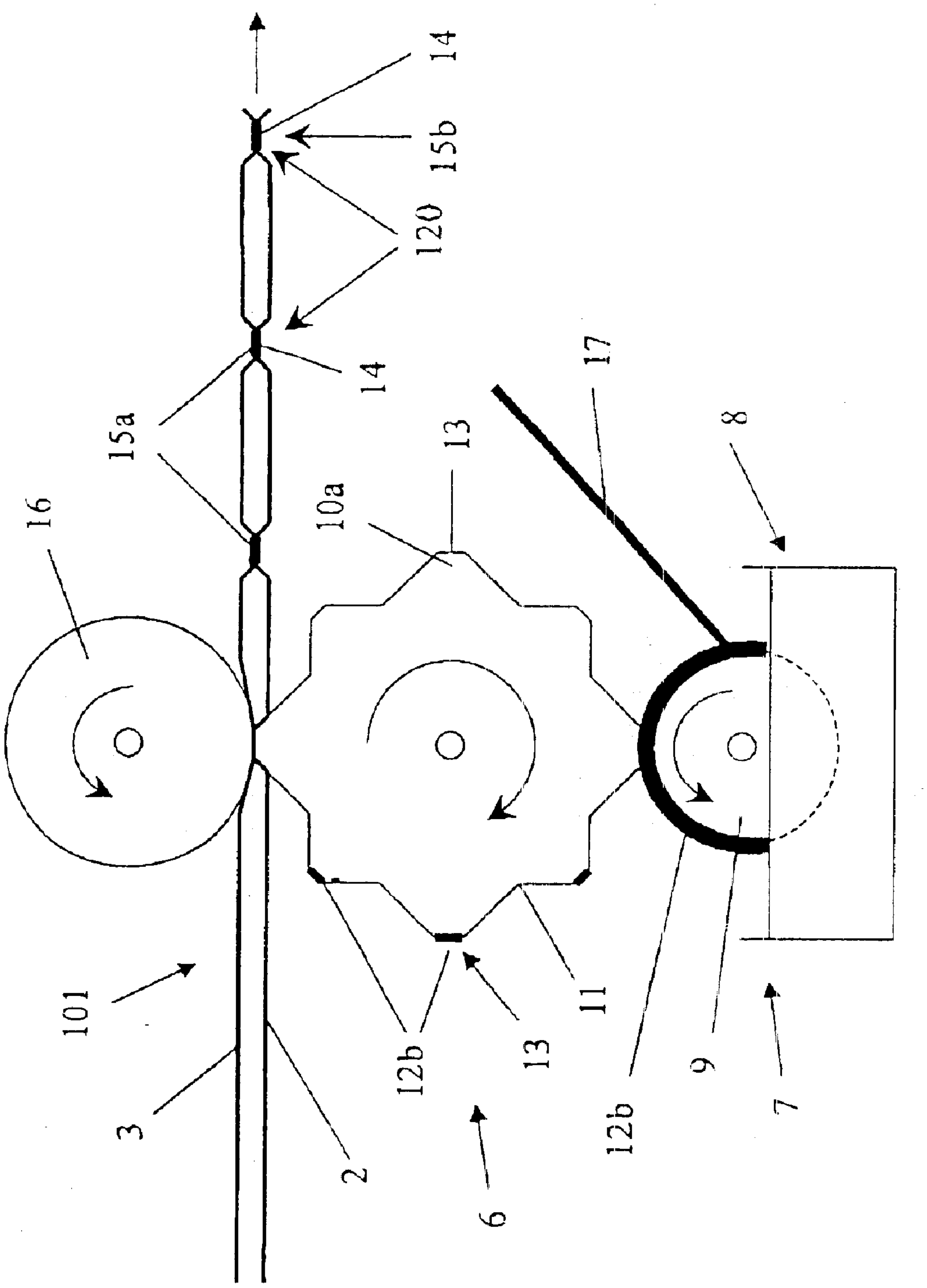
FIG. 3 shows diagrammatically a device for carrying out the method according to an embodiment of the invention, comprising a counter-roller and a web consisting of two layers.

FIG. 3 shows diagrammatically a device for carrying out the method according to another embodiment of the invention. In FIG. 3, the bonding device 4 consists of a support roller 16 which presses a multilayer web 101 against the tops 13 of the dye-coated raised macroportions 10*a* in a press nip. In other respects, the devices and layers shown in FIG. 3 correspond to the devices and layers shown in FIG. 1.

The support roller 16 and the embossing roller 6 press the multilayer web 101 together in such a way that a temperature increase takes place and a melt arises. As in the embodiment described in FIG. 1, a melt is formed at the bonding points 15*a* between the first layer 2 and the second layer 3. As in the previously described embodiments, the bonding points 15*a* give rise to the bonding areas 15*b* which in turn give rise to a three-dimensional macropattern. The dye from the tops of the dye-coated raised macroportions 10*a* dyes the bonding areas 15*b* in the same way as described previously, a dyed three-dimensional pattern 120 being formed.

The melt in the embodiment described in FIG. 3 can have an extent through the two layers in such a way that the dye can be mixed completely or partly in the melt, dyed distinct embossing of the multilayer web 101 taking place at the bonding points 15*a*. The support roller can also be used on a web consisting of one layer, as described in FIG. 2.

The support roller 16 can be hot or cold depending on which is most advantageous considering the material selection in the multilayer web 101. The embossing roller 6 can moreover be hot or cold depending on the material selection in the multilayer web 101. As the rolling technique described gives rise to heat which emanates from the rollers, the melt, i.e., the bonding point, is visible on at least that side of the web where a hot roller has been applied.

Figure 4:
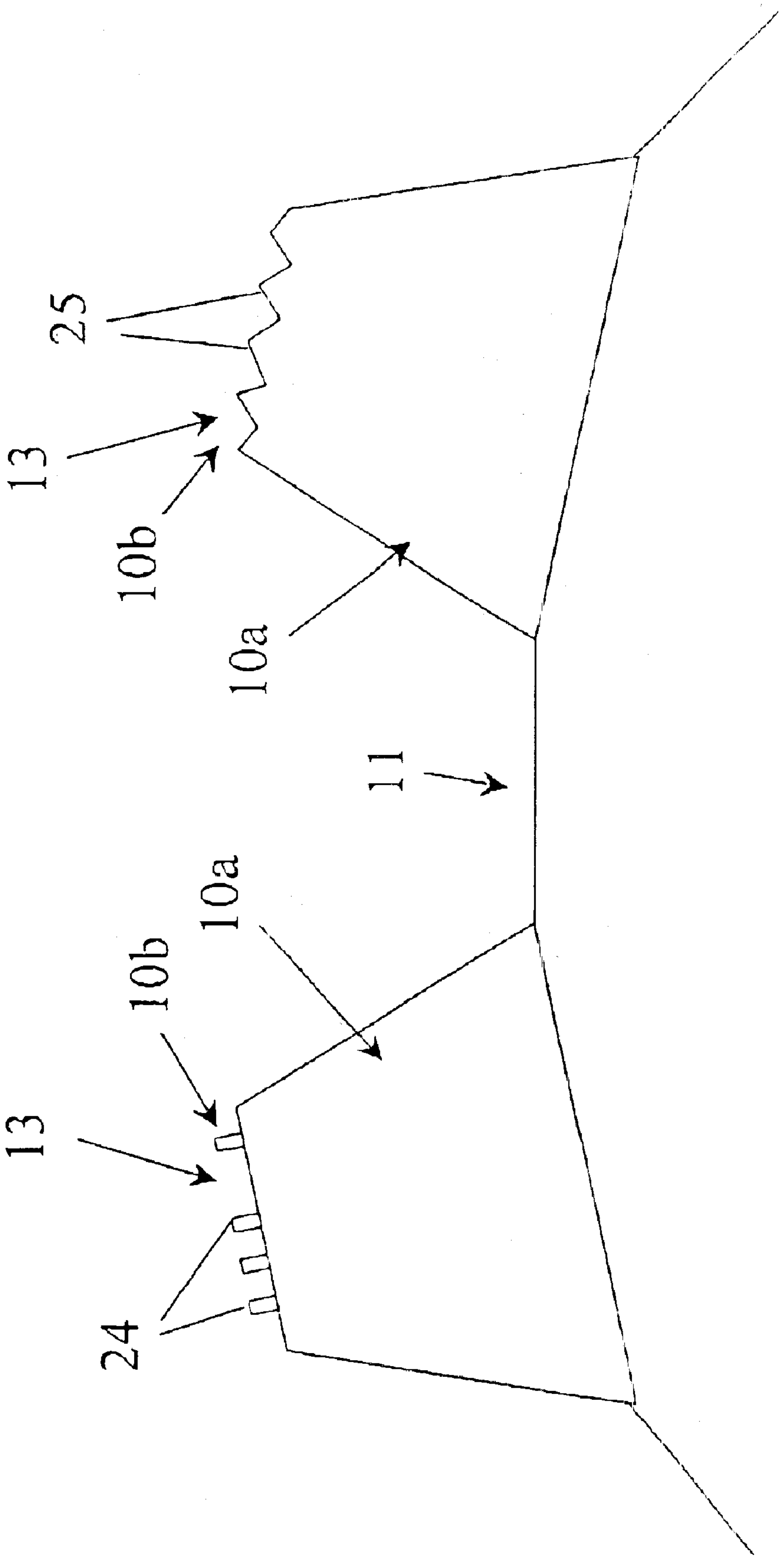
FIG. 4 shows diagrammatically a pattern device according to the invention with raised macroportions comprising raised microportions.

FIG. 4 shows an embodiment of the invention where the tops 13 of the raised macroportions 10*a* comprise a topographical surface comprising raised microportions 10*b*. FIG. 4 shows an enlargement of two raised macroportions 10*a* and a lowered macroportion 11. In accordance with the inventive idea, the tops 13 of the raised macroportions 10*a*, which tops consist of the raised microportions 10*b* in the said embodiment, are dye-coated. The raised microportions 10*b* are therefore dye-coated and give rise to micropatterns (see FIG. 5) in the abovementioned macropattern in such a way that the three-dimensional dyed macropattern becomes visible.

The raised microportions 10*b* can be designed in any known way, for example in the form of cylindrical elements, rhombic elements, wave-shaped elements, etc. FIG. 4 shows raised microportions in the form of cylindrical elements 24 on one raised macroportion 10*a* and raised microportions in the form of wave-shaped elements 25 on the other raised macroportion 10*a*. The raised macroportions can therefore be designed in different ways in order to bring about different types of macropattern in the web.

When the macropattern is formed, it is normally the case that the dye spreads between the raised microportions 10*b* and brings about a relatively uniform distribution of dye over the entire macropattern. It may also be the case that only the raised microportions 10*b* are dye-coated, the macropattern consisting of a number of micropatterns which create a visual impression of uniform dyeing of the macropattern for an observer when the observer is located at a certain distance from the pattern.

The raised microportions 10*b* can moreover give rise to bonding micropoints and three-dimensional bonding microareas coinciding with the raised microportions in the same way as the raised macroportions give rise to bonding points and three-dimensional bonding areas. In such cases, the bonding points consist of a number of bonding micropoints and the three-dimensional bonding areas of the same number of three dimensional bonding microareas.

In cases where there are no raised microportions, the macropattern consists of course of the three-dimensional bonding area, with a size which corresponds to the size of the top of the raised macroportion. In this case, the dyeing of the bonding points and the three-dimensional bonding areas will be uniformly distributed over the entire macropattern.

Figure 5:
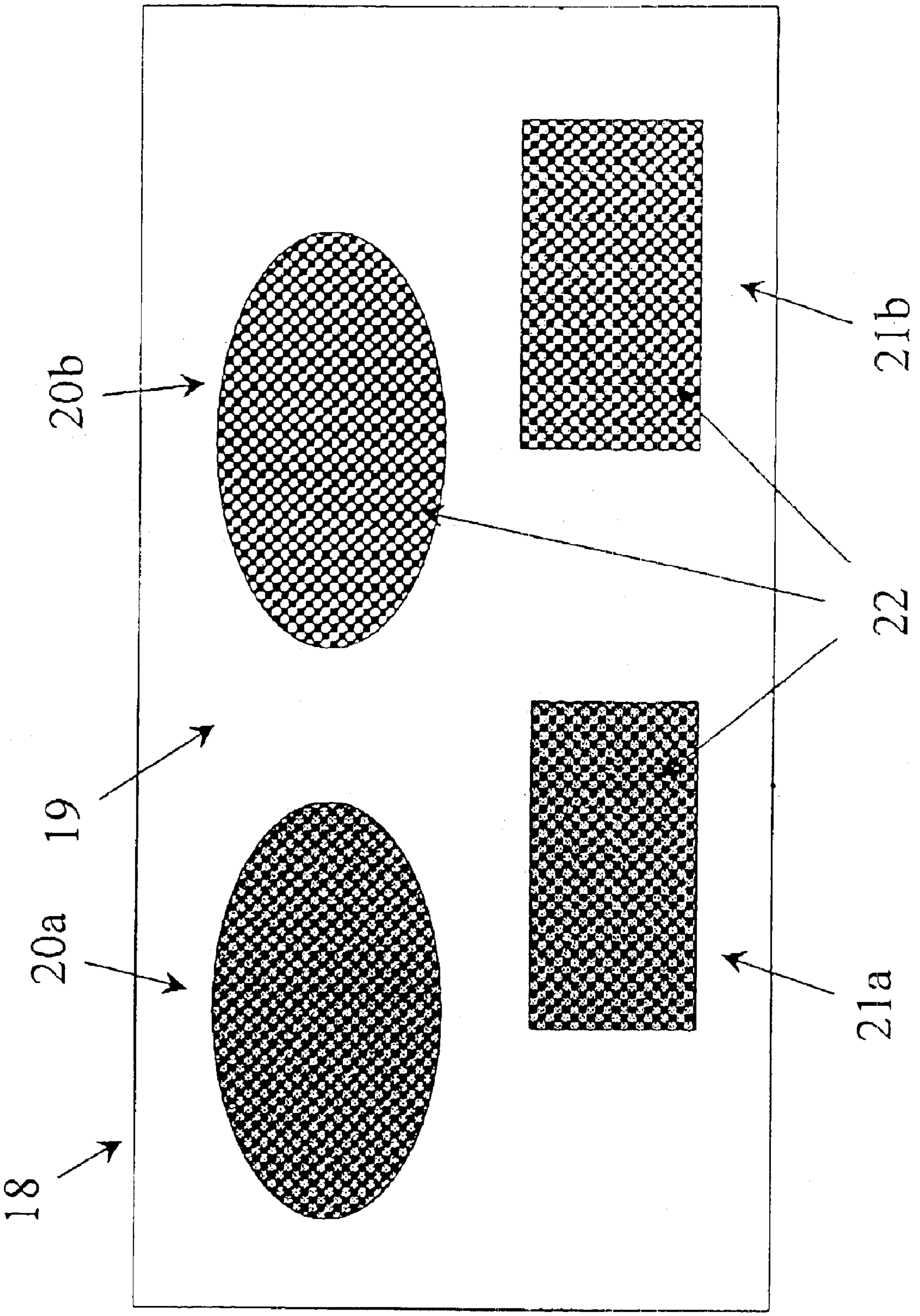
FIG. 5 shows diagrammatically a product pattern according to the invention comprising macropatterns and micropatterns.

FIG. 5 shows diagrammatically a product/web 18 with a product pattern 19 according to the invention. The product pattern 19 comprises macropatterns 20, 21 and micropatterns 22. FIG. 5 shows an oval macropattern 20*a*, 20*b* and a rectangular macropattern 21*a*, 21*b*. The macropatterns indicated by 20*a* and 21*a* are dyed and represent the dyed three-dimensional macropatterns to which the present invention relates. The macropatterns indicated by 20*b* and 21*b* are not dyed and represent three-dimensional macropatterns which arise on account of the formation of the bonding points and the bonding areas described in connection with FIGS. 1–3 where dyeing of the bonding areas has not taken place.

The various macropatterns 20*a*, 20*b*, 21*a* and 21*b* together give rise to the product pattern 19. The product pattern 19 can therefore be selected to consist entirely or partly of dyed macropatterns in different designs.

FIG. 5 also shows micropatterns 22 in the macropattern. The micropatterns 22 consist of the black dots in the various macropatterns 20*a*, 20*b*, 21*a* and 21*b* and can themselves, like the macropatterns, be dyed or undyed.

The method is not limited to what has been disclosed in the embodiments above but can be varied within the scope of the accompanying patent claims. By way of example, it may be mentioned that the present invention can be used for the formation of a product pattern comprising a number of different dyed three-dimensional macropatterns and moreover a number of three-dimensional macropatterns which are undyed. The macropatterns can have different colours and different appearances. One advantage of the present invention is that the pattern device can in a simple manner be dye-coated on different parts and with different colours, the method described above providing a product pattern which is sharp and clear for an observer.

Another example is that the dye-coating of the tops can take place by dye powder being applied to the tops via electrostatic fields. Another alternative to dye-coating the tops may be to introduce a dye strip or colored layer together with the web, which imparts color to the web on those parts of the web which come into contact with the tops.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A web of web-shaped flexible material with a three-dimensional dyed macropattern, comprising:

dyed macropatterns;

bonding points and three-dimensional bonding areas coinciding with the bonding points, wherein the bonding points comprise a solidified melt from joined material produced by a bonding device in interaction with the tops of the raised macroportions of a pattern device, and wherein the bonding areas and/or bonding points are dyed with a dye via the tops of the raised macroportions at the same time as the bonding points are formed, thereby forming the three-dimensional dyed macropattern.

2. The web according to claim 1, wherein the three-dimensional macropattern comprises a number of micropatterns, said micropattern having been applied to the web via raised microportions located on the tops of the raised macroportions.

3. The web according to claim 1, wherein the dye is non-adhesive.

4. The web according to claim 1, comprising a multilayer web including a first layer and a second layer of web-shaped flexible material, wherein the first layer is dyed via the tops of the raised macroportions and is connected to the second layer via the bonding points, and wherein the bonding points were formed by the bonding device joining the first layer to the second layer in interaction with the dye-coated tops at the same time as the bonding areas and/or the bonding points were dyed, thereby obtaining the three-dimensional dyed macropattern in the multilayer web.

5. The web according to claim 1, wherein the web comprises thermally bondable material.

6. The web according to claim 1, wherein the melt was produced by means of an ultrasonic device or in a press nip.

7. The web according to claim 1, wherein the dye in the bonding points is fixed in the bonding points via the melt.

* * * * *